(12) United States Patent
Allen (10) Patent No.: US 9,643,635 B2
(45) Date of Patent: May 9, 2017

(54) STORAGE AND TRANSPORTATION CART FOR RETAIL SHELVING

(71) Applicant: Stephen Edward Allen, Whitby (CA)

(72) Inventor: Stephen Edward Allen, Whitby (CA)

(73) Assignee: Stephen Edward Allen (CA)

( * ) Notice: Subject to any disclaimer, the term of this patent is extended or adjusted under 35 U.S.C. 154(b) by 0 days.

(21) Appl. No.: 14/843,402

(22) Filed: Sep. 2, 2015

(65) Prior Publication Data

US 2016/0280244 A1 Sep. 29, 2016

(30) Foreign Application Priority Data

Mar. 26, 2015 (CA) ...................................... 2886217

(51) Int. Cl.
*B62B 3/00* (2006.01)
*B62B 3/10* (2006.01)

(52) U.S. Cl.
CPC .................................. *B62B 3/108* (2013.01)

(58) Field of Classification Search
CPC .... B62B 3/00; B62B 3/02; B62B 3/04; B62B 3/108; B62B 3/10; B62B 3/002; B62B 3/005; B62B 2203/60
See application file for complete search history.

(56) References Cited

U.S. PATENT DOCUMENTS

| | | | | | |
|---|---|---|---|---|---|
| 45,648 | A | * | 12/1864 | Smith | G03B 21/54 211/41.1 |
| 3,007,708 | A | * | 11/1961 | Ochs | A47B 55/02 108/107 |
| 3,608,920 | A | * | 9/1971 | Rubin | B62B 3/16 280/33.998 |
| 3,861,704 | A | * | 1/1975 | De Witte | B62B 3/002 280/79.3 |
| 3,912,086 | A | * | 10/1975 | de Bruyn | A47F 5/0093 16/88 |
| 5,718,441 | A | * | 2/1998 | Kern | A47B 57/14 211/187 |
| 5,924,577 | A | * | 7/1999 | Gessert | A47B 81/00 211/162 |
| 6,116,436 | A | * | 9/2000 | Ferrucci | A47B 55/02 108/181 |
| 7,213,816 | B2 | * | 5/2007 | Gregory | B62B 3/106 280/33.996 |
| 7,392,993 | B1 | * | 7/2008 | Prohl | A47F 5/137 280/33.998 |
| 9,192,252 | B2 | * | 11/2015 | Lindblom | A47F 5/137 |

(Continued)

*Primary Examiner* — James M Dolak (57) ABSTRACT

A lightweight utility cart for the transportation and/or storage of retail display shelves comprising a thermoplastic base and top, a plurality of rectangular tubular posts and a plurality of wheels. Currently available retail display shelves are placed vertically into such a cart from two opposing sides of the cart and secured within the cart by way of integrated partitions formed in the top and base members providing a method of separation and capture for inserted shelves thus eliminating the likelihood of shelf damage resulting from contact with adjacent shelves while placed in the cart. Upon the loading of shelves into the cart, the shelves can be safely stored in the cart for later use or easily transported throughout a typical retail environment conveniently and securely for placement in a retail shelving system.

8 Claims, 8 Drawing Sheets

(56) References Cited

U.S. PATENT DOCUMENTS

| | | | | |
|---|---|---|---|---|
| 9,481,386 B2* | 11/2016 | Martell | ...................... | B62B 3/00 |
| 9,481,387 B2* | 11/2016 | Della Polla | ........... | B62B 5/0093 |
| 9,511,785 B2* | 12/2016 | Yang | ....................... | B62B 3/002 |
| 9,522,763 B2* | 12/2016 | Roman | .............. | B65D 21/0233 |
| 9,527,207 B2* | 12/2016 | Low | ....................... | B25J 9/0087 |
| 9,566,992 B2* | 2/2017 | Papadakis | ............... | B62B 3/005 |

* cited by examiner

FIG. 9

STORAGE AND TRANSPORTATION CART FOR RETAIL SHELVING

BACKGROUND OF THE INVENTION

The present invention relates to utility carts. The present utility cart relates more specifically to utility carts used in the transportation and storage of retail display shelving.

Utility carts are used in a variety of retail applications and typically include an upper and lower shelf positioned horizontally, 4 elongated legs or posts and a plurality of wheels or casters attached to the underside of the shelf or base. The shelves are typically attached to the legs by rivets, screws or welds.

These types of conventional carts are well know in the art and it can be said that wheeled carts have been in commercial and retail service for hundreds of years. The necessity for the transportation of articles that an individual could not physically or safely perform on ones own is well founded. Normally being comprised of 4 wheels, a frame and a plurality of fixed or removable shelves and often a handle, this standard cart design is vigorously employed in all areas of manufacturing and a staple in the retail service sectors of a modern economy. The basic design of the utility cart has changed little since it's inception because of it's ability to be easily produced and it's overall functionality and simplicity. Not only does the utility cart aid in the production and distribution of manufactured articles in a commercial setting, it provides the individual charged with the relocation of articles a safe method of conveyance for achieving this task. A typical cart of this type is shown in The United States of America Patent to Kern et al. U.S. Pat. No. 5,718,441.

For most items transported within retail and commercial environments, the conventional shelf carts are the design of choice primarily because manufactured articles typically present in a predominately planar form or are packaged in a manner to acquire this efficient and serviceable design allowing for the relatively safe and secure placement of individual or multiple articles on a single cart shelf. This cubic structure associated with a majority of packaged articles allows most currently available conventional utility carts to demonstrate their proficiency in this area. Yet there are instances where articles for transport do not present generally in this form and thus render the standard utility cart appreciably inappropriate for use and therefore create a need for article specific utility carts to provide safe and efficient conveyance of these often irregularly shaped or cumbersome items as in the United States of America Patent to Elliot. U.S. Pat. No. 5,871,219.

Most recently 2 U.S. Applications for patent, 20150076779 Lindblom et al and 20150034579 Shawn Michael Kahler et al, have addressed this issue of retail shelf storage and transportation. Although each of these patent application deals with the need for idle shelving storage or the repositioning of shelving, they exhibit a common approach. Most notably the positioning of stored shelves horizontally in each device. This does somewhat remedy the problem of safe shelf storage and transport, but shelves placed in each of these devices would still come in contact with other shelves increasing the possibility of aesthetic damage. These designs also place the stored shelves at varying height positions in relation to the user of the device and thus require the user to, at times, lift shelves from various elevations potentially increasing the risk of operator fatigue or strain. A device wherein all shelves, either inserted or withdrawn, are located in a physically favorable, uniform height relative to the operator would be highly beneficial over the course of normal and extended use.

There are also instances wherein products for storage or transport are positioned vertically in carts or similar apparatuses for reasons of efficiency and product protection as well as occasionally providing the cart operator a potentially easier and safer manner in which to load or unload articles from the cart. Furthermore, the use of article dividers that are often constructed of a pliable yet firm material, whether it be for the placement of articles in a horizontal or vertical alignment, as a damage prevention feature for the articles whilst on utility carts, has been employed in the area of product transportation for many years. Typical carts or constructs demonstrating this concept of vertical or horizontal article isolation placement for transport or storage are shown in United States of America Patents to Gessert U.S. Pat. No. 5,924,577, Ferrucci U.S. Pat. No. 6,116,436, and Maurer et al. U.S. Pat. No. 3,349,924. Though such carts have successfully dealt with storage and transportation issues of specific articles, there exists an area for improved safety and efficiency in the field of retail display shelf storage and transport.

All of the examples of prior art thus far have provided solutions for articles characteristically presenting in planate form. Each of the carts referenced are constructed with the use of parallel channels, ruts or guides to accept and contain goods which are manufactured with consistent dimensional attributes. Items for storage in these types of carts that do not present in planate form are often mounted to panel subassemblies (Maurer et al. U.S. Pat. No. 3,349,924) to then be placed into the carts parallel channels. Each of these carts maintains a nonvarying channel width and therefore can only effectively accept goods or mounting subassemblies that are uniform in, what would be normally be considered, the thickness of the item or subassembly. Gessert's cart, (U.S. Pat. No. 5,924,577) is approached in much the same manner as Maurer's (U.S. Pat. No. 3,349,924). Each cart's channels are dependent upon straight parallel goods or backing plates to allow insertion into the cart. For this reason, carts of this type construction would be unusable with one piece wire welded display shelving. Today a substantial amount of retail shelving is constructed as a one piece welded unit with end bracket profiles that can be referred to as multi-sided irregular polygons. Therefore a cart with channels or containment areas designed to effectively accommodate these non-parallel items would be advantageous and as a result would be employed exclusively for the transporting or storing of these irregularly shaped shelves.

SUMMARY OF THE INVENTION

As this consideration relates to the current invention, it is common in retail environments for employees to reposition and replace display shelving. Currently, retail display shelf transportation within a retail setting is customarily achieved by the somewhat improvisational use of the aforementioned standard utility cart. These carts commonly used in retail settings fail to sufficiently address the need for the safe and secure transport of retail display shelving because typical end bracket profiles on a variety of retail display shelves are commonly fabricated in, what can be viewed as, a multi-sided irregular polygonal shape more reflective of a triangle and as a consequence make it very difficult to stack. Most retail display shelf manufacturers offer this asymmetrical, structurally advantageous design which has proven to be very effective when addressing load bearing issues but unintentionally present a problem when the stacking or laying down of display shelves is attempted. The predominate use of this anomalously shaped end bracket for retail display shelf support in the manufacture of retail shelves has created a need for a dedicated utility cart that can proficiently store and transport these types of shelves. By not only providing a safe and secure method of transport for the previously described irregularly shaped retail display shelves, a retail display shelf specific utility cart will invariably assist in reducing display shelf damage and as a result lessen the operating costs associated with equipment replacement.

An additional concern for retailers is the storage of auxiliary display shelving. In a typical calendar year many retailers alter displays based on seasonal or cultural interests as defined by consumers, thus causing the quantity of shelves in use to fluctuate. For this contributory reason, most retailers maintain a discretionary number of extra retail display shelves in their place of business but unfortunately typical retail store environments invariably have limited storage space for supplemental equipment due to the stocking requirements of products intended for sale. As a result, a designated area for display shelving is occasionally non existent or precarious at best. With this lack of dedicated retail display shelf storage, display shelves are often placed perilously on top of one another with little regard and as a consequence periodically create damaged shelves which then must be replaced immediately for reasons of safety and functionality. Therefore an undamaged supply of surplus display shelves is essential and must be maintained as the need for display shelves fluctuates. With this continuous oscillation of the total number of shelves in use, auxiliary shelving must be maintained and stored in a safe manner that allows them to be conveniently and readily accessible by employees.

Thus it would be advantageous for a utility cart that addresses the current shortcomings of the conventional utility carts presently available in the area of retail display shelf transportation and/or storage.

BRIEF DESCRIPTION OF THE DRAWINGS

Many of the attendant advantages of the present invention will become more readily apparent and better understood as the following detailed description is considered in connection with accompanying drawings, in which.

DETAILED DESCRIPTION OF THE INVENTION

The present invention provides a light weight modular utility cart which is easy to manufacture and assemble. Ease of manufacture and assembly is accomplished by way of the carts structural design and simplicity of its components.

The term "shelf, shelves or shelving", as used herein shall refer to one piece welded retail display shelves manufactured using multi-sided irregular polygonal shaped end bracket profiles.

Figure 1:
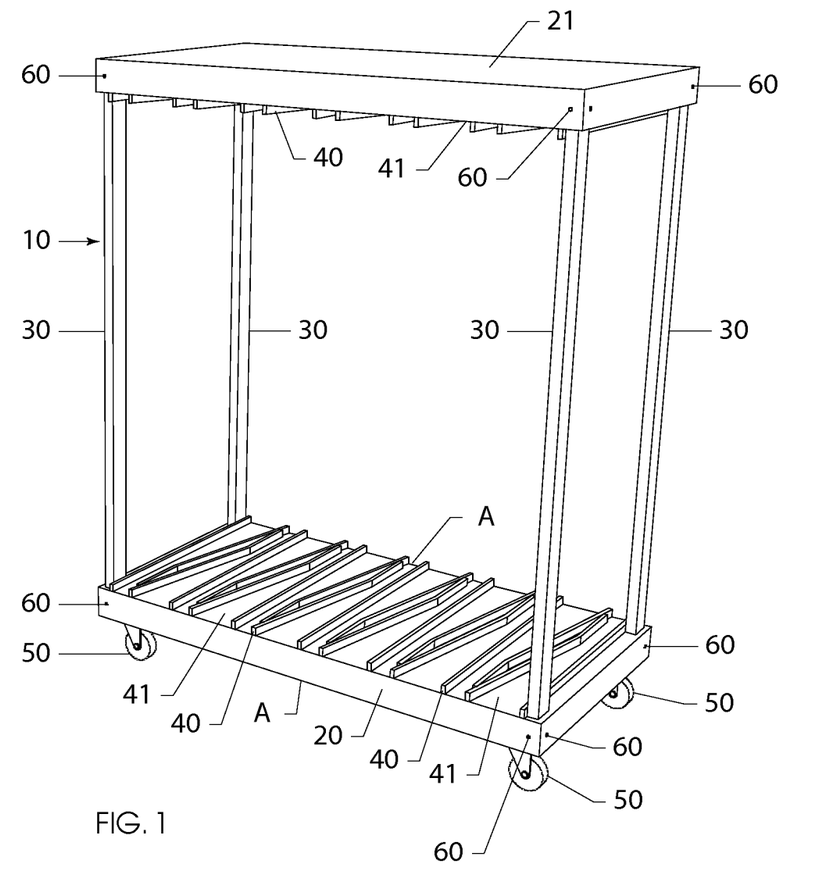
FIG. 1. shows a perspective view of the preferred embodiment of the present invention.

As shown in FIG. 1, the foregoing limitations of prior utility carts have been overcome by the present invention in it's various embodiments, in which, according to one embodiment, a utility cart 10 is provided having a one piece moulded base member 20, corresponding one piece moulded top member 21, 4 rectangular tubular elongated corner posts 30 and a plurality of rotatable casters 50.

Along with providing a rigid yet lightweight apparatus, there are numerous advantages for the use of a moulded thermoplastic polymer material in the composition of the devices' 10 upper 21 and lower members 20, as shown in FIG. 1. The fundamental reason being the ability to incorporate shelf positioning and securing partitions 40, establishing divaricately shaped containment areas, into the base member 20 and top member 21, as shown in FIG. 1, during the casting process achieving enhanced structural integrity of the partitions 40 and the resultant consistency of partition 40 spacing. The use of a non marring thermoplastic polymer in the creation of the top 21 and base 20 members of the device 10 reduces the incidence of aesthetic damage to shelves 80 during the insertion of shelves 80 into the device10 and, conversely, the retrieval of shelves 80 from the device10.

Figure 2:
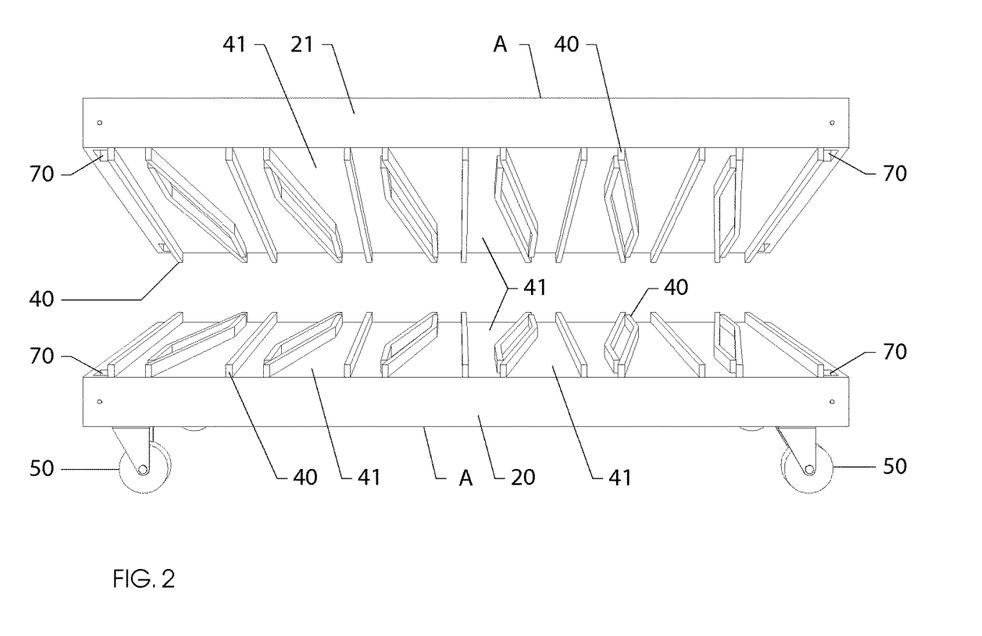
FIG. 2. is a perspective view of the top and base members of the cart illustrating an exemplary embodiment of the invention.

As shown in FIG. 2, the moulded base member 20 and complimentary moulded top member 21 of the present invention include corresponding positioning and securing partitions 40 rising perpendicularly from said base member 20 and, correspondingly, emanating downwardly from said top member 21, when the device 10 is assembled, creating vertically protuberant boundaries reflecting multi-sided irregular polygonal shaped end profiles 42 of retail display shelving 80 which is intended for insertion into the device 10 for storage or transport. These shelf positioning and securing partitions 40 create a plurality of upper and lower aligned apertures, which as a result, define access points 41, as shown in FIG. 2, to which the individual shelves 80 could be inserted or withdrawn. These partitions 40, which as well as acting as guide members, would also limit the shelf's depth of insertion into the device 10 and thus position the shelves 80 optimally within the device 10. The integration of these partitions 40, within the top 21 and bottom 20 members, provides a mechanical separation between inserted shelves 80 as well as positive shelf detention. Due to the fact that a considerable number of shelf manufacturers produce a variety of proprietary shelf end profiles 42 as well as an assortment of shelves 80 with varying dimensions, numerous shelf specific moulds would need to be manufactured in order to produce an assemblage of top 21 and base 20 members ensuring accurate mating between the shelf contemplated for insertion into the device 10 and the device 10.

Figure 3:
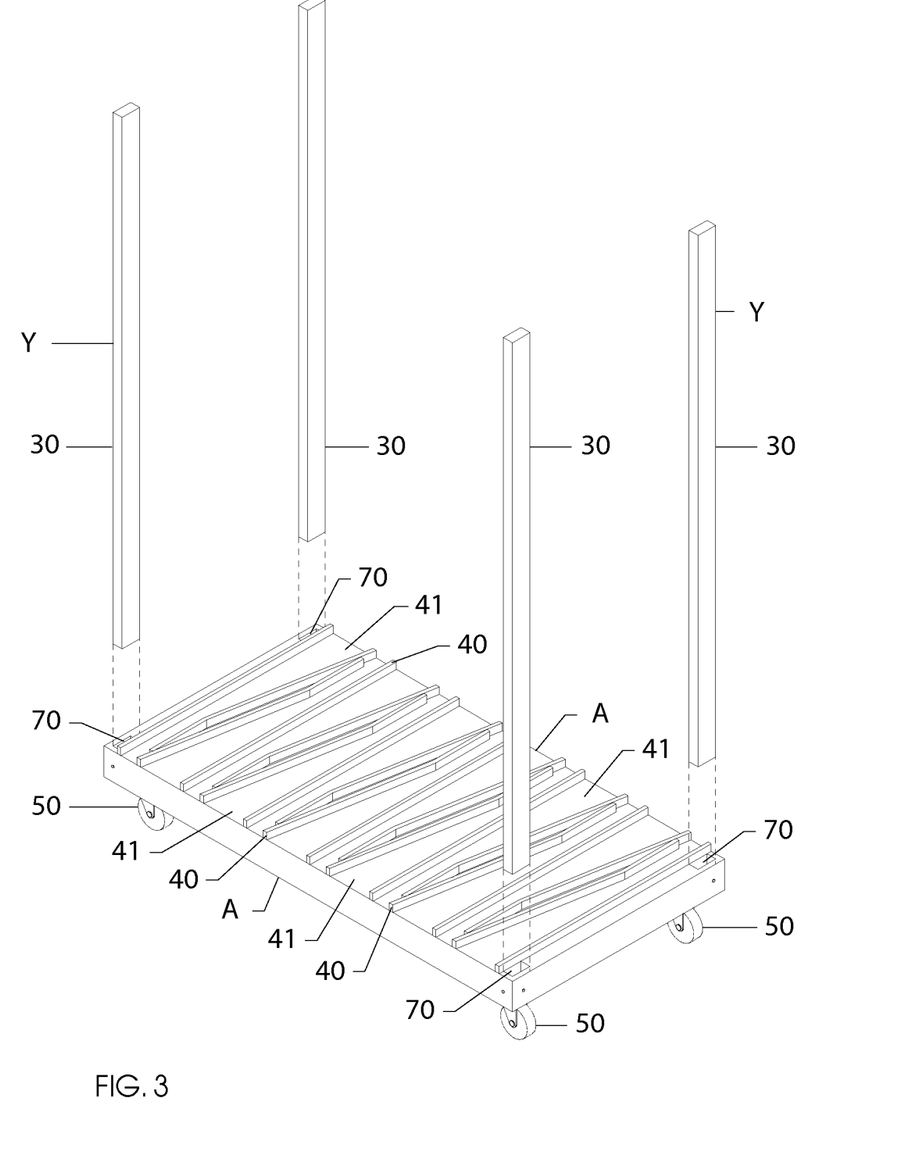
FIG. 3. is a partial exploded perspective view of the application of rectangular tubular posts into the base member, according to the present invention.
Figure 4:
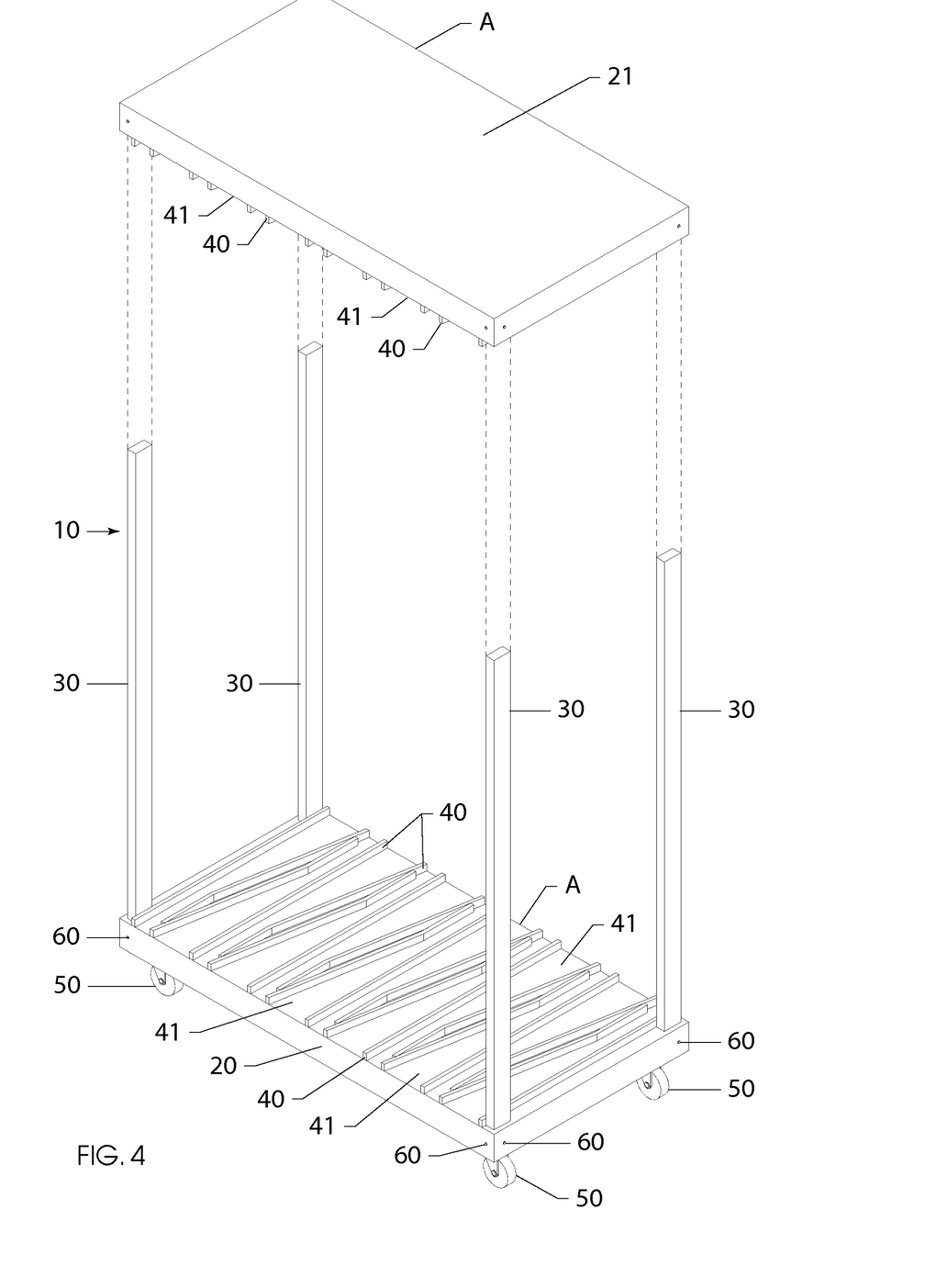
FIG. 4. is a perspective view of the application of the top member onto rectangular tubular posts for completion of assembly of the present invention.
Figure 5A:
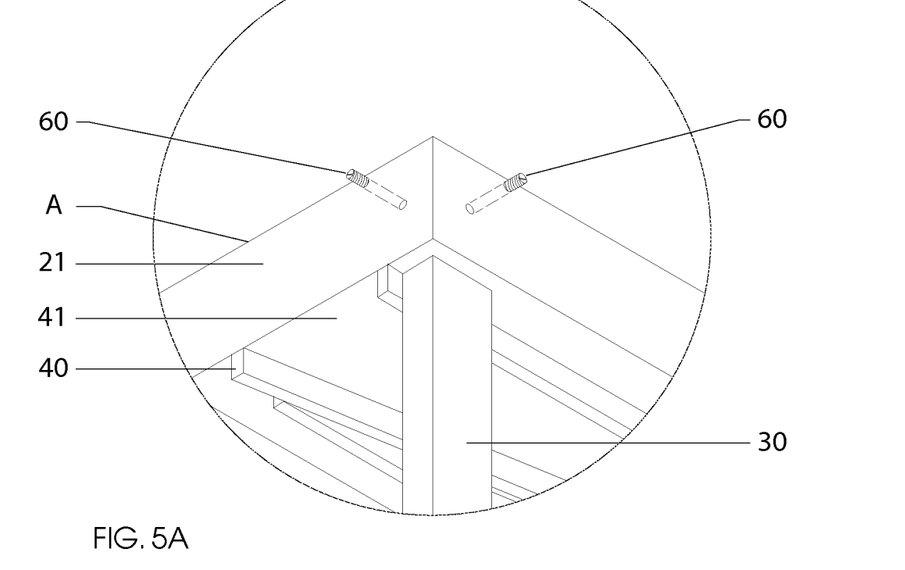
FIGS. 5A. and 5B. are enlarged fragmentary perspective views of rectangular tubular post securement, according to the present invention.
Figure 5B:
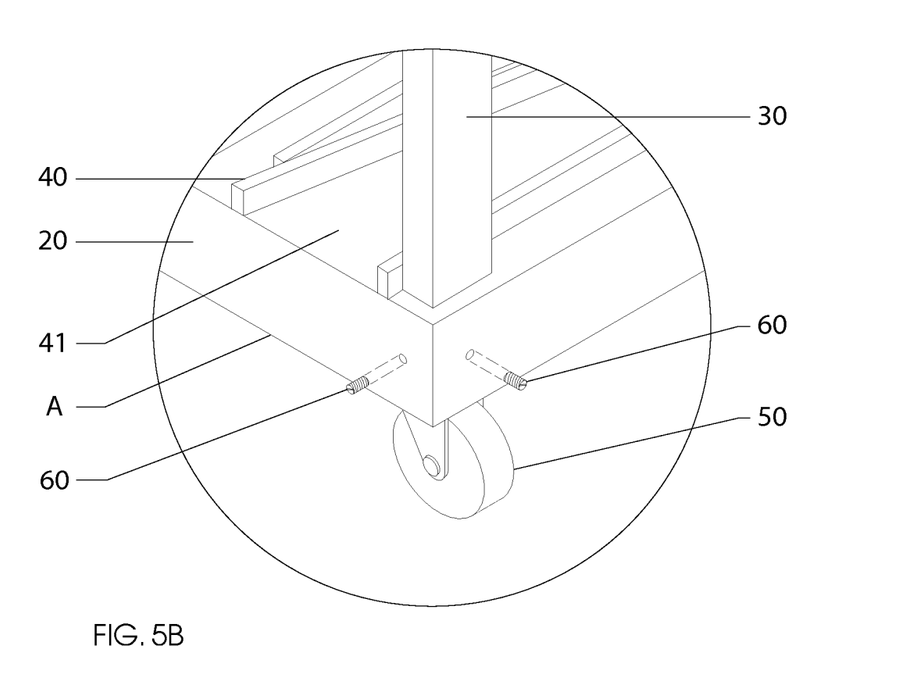

Within the moulded base 20 and top 21 members of the device 10, there would exist 4 cavities 70, as shown in FIG. 2, generated during the injection casting process for acceptance of 4 rectangular tubular elongated supporting corner posts 30. After firmly urging the 4 post ends into the 4 complimentary bores 70 of the base member 20, as shown in FIG. 3, the top member 21 would be positioned over top of the 4 now inserted rectangular tubular corner posts 30, as shown in FIG. 4 to which one can one can now begin firmly engaging the post ends into the receiving cavities 70 formed on the underside of the top member 21. Once positioned in the complimentary bores 70 of the moulded top 21 and bottom 20 members, screws 60 would be driven laterally first through the moulded top 21 and base 20 members, as shown in FIGS. 5A and 5B, and then continuing into the portion of the rectangular tubular corner posts 30 which are now residing in the post cavities 70. The introduction of screws 60 inhibits the inserted posts 30 from being removed from the device 10 accidentally as well as augmenting the structural integrity of the device 10. The dimensional lengths Y of the 4 rectangular tubular corner posts 30, and the resultant space that would exist between the upper member 21 and lower member 20 once the device 10 was assembled, would be determinate upon width W of the display shelves 80, selected to be inserted into the device 10. Plate type casters 50 are secured in each of the four corners of the underside of the lower member 20 of the device 10 allowing the device portability.

Figure 6:
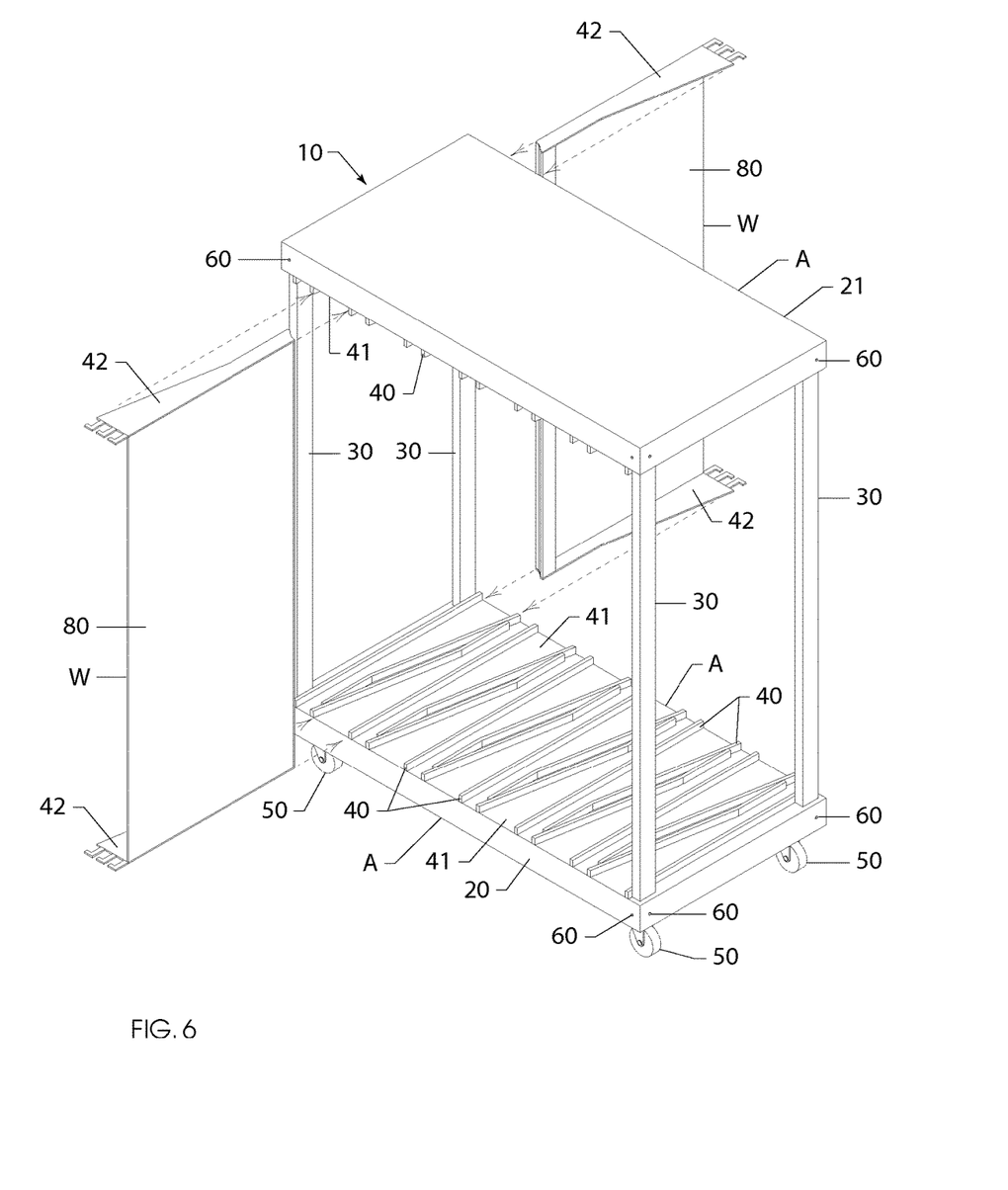
FIG. 6. is a perspective view of the present invention illustrating the insertion of shelves into the cart, according to the present invention.

With the present invention assembled, as shown in FIG. 6, an individual can now begin to insert retail display shelves 80 into the device 10, as shown in FIG. 6. As an individual faces one of the devices' 2 longest sides, also acknowledged as the width A of the device 10, as shown in FIG. 6, he or she can now insert vertically oriented shelves 80, as shown in FIG. 6, into the device 10 by way of an insertion access point 41 as defined by the partition 40 spacing created on the base 20 and top 21 members. Advancing the shelves 80 into the device 10 until the shelves 80 achieve a consolidated fit with the partitions 40 in the device 10, as shown in FIG. 7.

Figure 7:
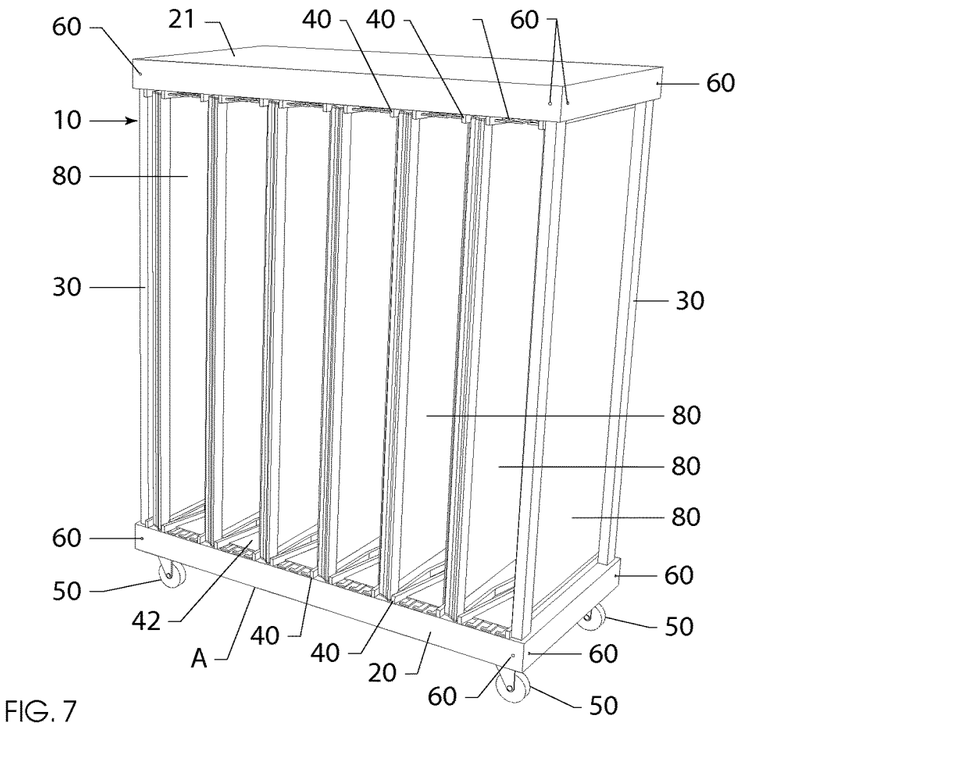
FIG. 7. shows a perspective view illustrating a plurality of shelves inserted into the cart, according to the present invention.
Figure 8:
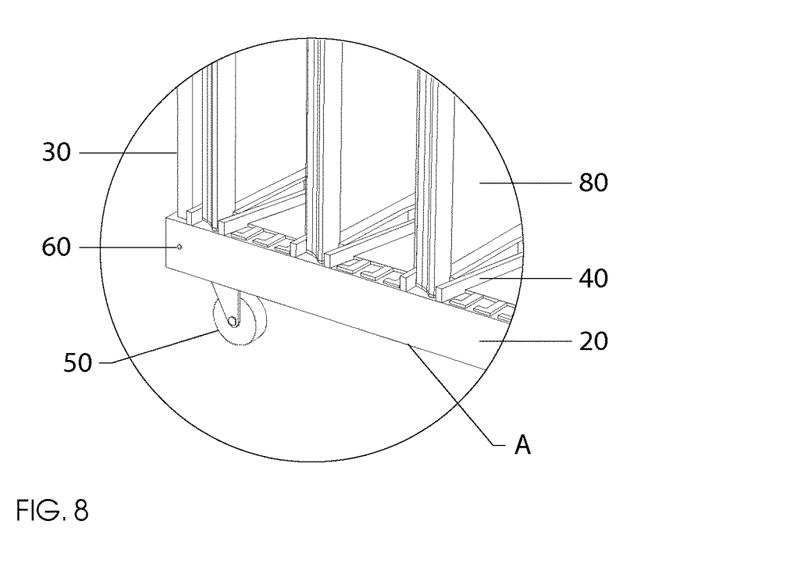
FIG. 8. is an enlarged fragmentary perspective view of the cart illustrating the arrangement of shelves once positioned in the cart, according to the present invention.
Figure 9:
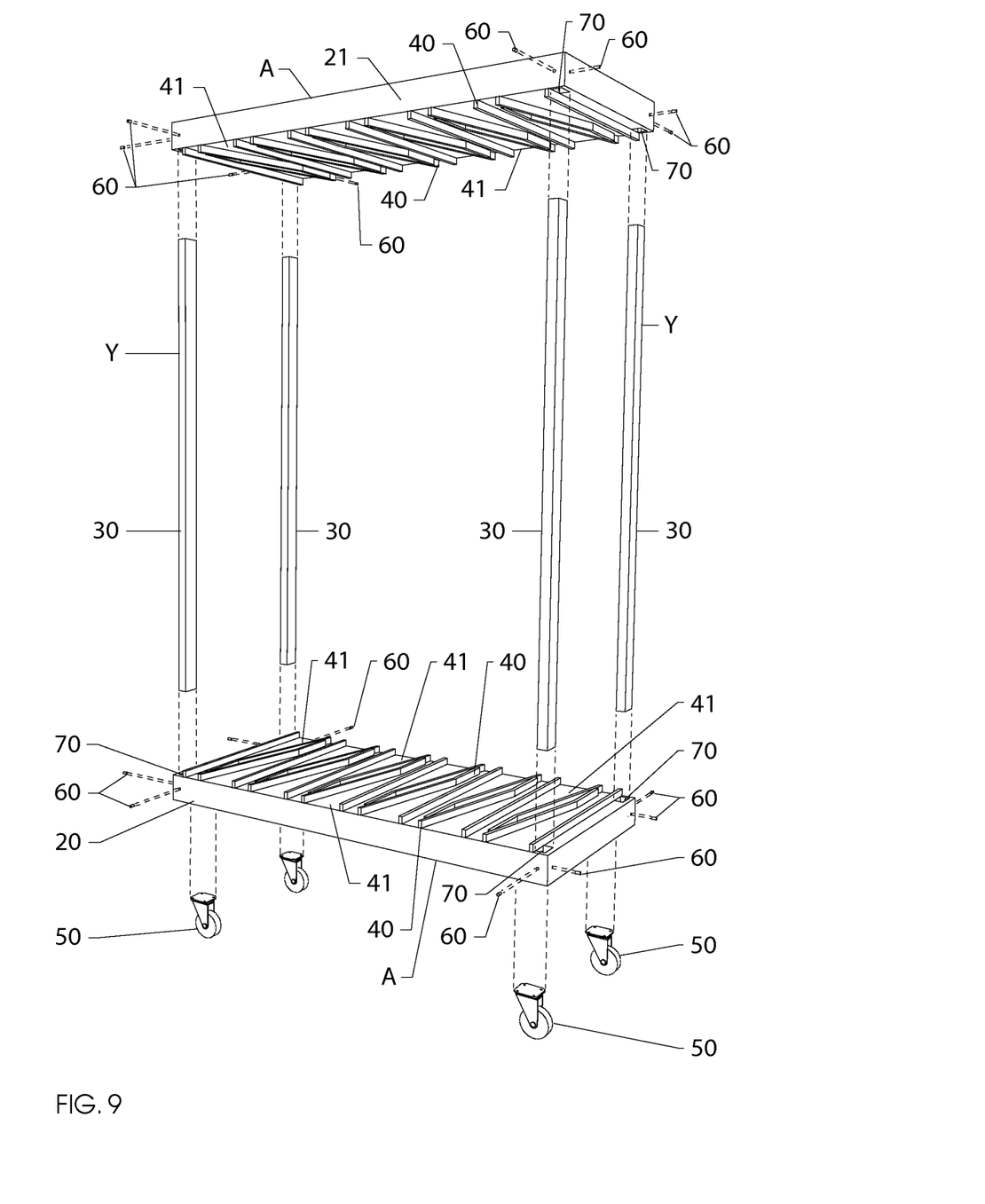
FIG. 9. is an exploded perspective view of the cart shown in FIG. 1, according to the present invention.

To achieve the maximum number of retail display shelves 80 capable of being inserted into the device 10, one half the total number of retail display shelves 80 the device 10 is capable of storing would be inserted from one side of the of the device 10, as in FIG. 7, and the other half of the total number of retail display shelves 80 the device 10 is capable of storing, would be inserted from the opposing side of the device 10, as shown in FIG. 7. This loading of retail display shelves 80 from opposing sides of the device 10, as shown in FIG. 7, allows for the most efficient use of space within the devices' 10 dimensional parameters as shown in FIG. 8.

Once the retail display shelves 80 are inserted into the device 10, an individual can now move the device 10 safely and securely to a desired location within a retail or commercial environment and then extract the shelves 80, currently positioned in the device 10, for the installation of shelves 80 into a retail shelving system or, furthermore, loaded shelves 80 may remain in the device 10 for future use.

By reason of the foregoing description, in the utility cart 10 disclosed successfully solves the ongoing problem of storing and transporting one piece welded retail shelving 80 in an economical, safe and space saving manner. The advent of dedicated shelf positioning and securing partitions 40, that are integrated into each base 20 and top member 21 during fabrication, provide a positive glove like fit for vertically oriented shelves as they effectively mimic multi-sided irregular polygonal shaped shelf end bracket 42 profile characteristics. Consequently, it is the bulkier dimensional proportions and shape of these types of retail shelves which render the prior art cited as unsuitable even with minor modifications. Consequently, it is a utility cart fashioned exclusively to this form of shelf fabrication by reason of the partition patterning described and illustrated. As an added benefit, this component like construction allows for replacement parts to be easily obtained and incorporated into the cart 10 with minimum effort and instruction in the event the cart 10 experiences accidental damage. Therefore a cart that successfully stores and transports one piece welded retail shelves with minimum effort and maximum efficiency would be advantageous and appreciated in a retail or commercial setting.

The above description is not intended to limit the meaning of the words used or in the scope of the following claims that define the invention. Rather it is contemplated that future modifications in structure, function or result will exist that are not substantial changes in what is claimed are intended to be covered by the claims. Thus while preferred embodiments of the present invention have been illustrated and described, it will be understood that changes and modifications can be made without departing from the claimed invention.

The invention claimed is:

1. A utility cart for the storage and transportation of one-piece welded retail display shelves for use in a retail or commercial environment, wherein the shelves have multi-sided irregular polygonal-shaped end bracket profiles, wherein the cart is comprised of:
    an elongated base member, comprising: integrated partitions and four integrated vertical support post receiving cavities, wherein the base member is constructed of a thermoplastic polymer material, and wherein said integrated partitions are comprised of at least one upwardly projecting set of partitions defining a divaricately-shaped shelf containment area matching the irregular polygonal-shaped end bracket profile of the shelves;
    an elongated top member, comprising: integrated partitions, and four integrated vertical support post cavities, wherein the top member is constructed of a thermoplastic polymer material, and wherein said integrated partitions are comprised of at least one downwardly projecting set of partitions defining a congruent divaricately shaped shelf containment area matching the irregular polygonal-shaped end bracket profile of the shelves;
    four rectangular tubular support posts for suspending said top member in vertical alignment directly above said base member therein constituting a designated retaining area for storage and transportation of the one-piece welded retail display shelves loaded in an upright position; and
    a plurality of plate casters enabling said cart portability.

2. The utility cart as set forth in claim 1 wherein said base member and said top member of said cart are individually cast of the thermoplastic polymer material by way of an injection moulding process.

3. The utility cart as set forth in claim 1 wherein said divaricately shaped containment areas and resultant apertures are disposed on said elongated base member and said elongated top member by the formation of shelf positioning and securing partitions of which said partitions are propagated simultaneously during the injection moulding process and thus become integrated into what comprises said base member and said top members of said cart.

4. The utility cart as set forth in claim 3 wherein the resulting shelf positioning and securing partitions generated on said base member and said top member during the process of injection moulding, efficaciously delineate multi-sided irregular polygonal shaped end bracket profiles of said one piece welded retail display shelving for deliberate shelf position demarcation on what is generally considered a top surface area of said base member and conversely what is generally considered an underside surface area of said top member when said cart is assembled comprising a designated shelf containment area for the expressed purpose of passively securing and isolating shelves whilst said shelves reside in a designated vertical position whilst in said cart.

5. The utility cart as set forth in claim 4 wherein said partitions created during the injection moulding process on said base member and said top member clearly assign said shelf insertion apertures in a sequence in which shelves intended for insertion through said apertures into said cart are sequentially alternated from what is considered the longest horizontally viewed side of said cart to it's parallel opposing side and thus place the front of one shelf inserted into said cart distinctly adjacent to the back of the next shelf inserted in succession from said cart's opposing side.

6. The utility cart as set forth in claim 1 wherein the vertical support post receiving cavities disposed in corner positions of a substantially rectangular shape, are incorporated into said moulded base member and said moulded top member during the injection moulding process.

7. The utility cart as set forth in claim 1 wherein said rectangular tubular posts are firmly inserted into said post receiving cavities, achieving a mechanical bonding commonly referred to as a friction fit as a means of conjoining said elongated base member and said elongated top member in a generally horizontal parallel relationship and as a result aligning said shelf positioning and securing partitions of said top member directly above said shelf positioning and securing partitions of said base member.

8. The utility cart as set forth in claim 1 wherein said plate casters are affixed to corner positions of a substantially rectangular shape on an underside of the base of said cart for the expressed purpose of said carts' mobility and maneuverability.

* * * * *